United States Patent [19]

Mehrens et al.

[11] 4,424,007

[45] Jan. 3, 1984

[54] PUMP AND FILTER ASSEMBLY FOR EVAPORATIVE COOLERS

[76] Inventors: Douglas W. Mehrens, 918 W. Portland, Phoenix, Ariz. 85004; James F. Kuchar, 5524 E. Cactus, Scottsdale, Ariz. 85254

[21] Appl. No.: 311,986

[22] Filed: Oct. 16, 1981

[51] Int. Cl.³ .................. F04B 35/04; F01D 15/08; B01D 35/02
[52] U.S. Cl. .................. 417/360; 415/121 G; 210/416.1; 261/6
[58] Field of Search .................. 417/360, 361, 313; 415/121 R, 121 G; 210/416.1; 261/6, 3; 55/510, 515

[56] References Cited

U.S. PATENT DOCUMENTS

| 3,260,214 | 7/1966 | Goettl et al. | 415/121 G |
| 3,333,834 | 8/1967 | Brewster | 415/121 G |
| 3,904,393 | 9/1975 | Morse | 261/4 X |
| 4,275,995 | 6/1981 | Taylor | 417/360 X |

Primary Examiner—Richard E. Gluck
Assistant Examiner—Peter M. Cuomo
Attorney, Agent, or Firm—Warren F. B. Lindsley

[57] ABSTRACT

An improved pump and filter assembly for application in evaporative coolers comprising a molded plastic housing enclosing a pump and providing support for a replaceable cylindrical filter that protects the pump against contamination by air and waterborne particles, thereby assuring longer pump life and more reliable service.

7 Claims, 3 Drawing Figures

PUMP AND FILTER ASSEMBLY FOR EVAPORATIVE COOLERS

BACKGROUND OF THE INVENTION

With the advent of higher energy costs, the evaporative cooler as an air conditioning system is again assuming prominence in the marketplace. Its installation and operating costs are more economical than a refrigeration unit and even where a refrigeration system is needed, the trend is now to utilize both types working together to provide an air conditioning system. Improvements to existing forms of evaporative coolers have thus assumed renewed importance.

One problem associated with evaporative coolers is that the water-circulating pump is typically not provided with a filter. As a result the pump tends to become clogged with dirt and debris. Because of the constant influx of dust-laden air into the cooler this problem can be especially pronounced. The provision of an effectively filtered circulating pump thus constitutes a significant improvement offering a number of benefits including extended pump life, reduced maintenance costs and an overall improvement in cooling system reliability.

DESCRIPTION OF THE PRIOR ART

At the present time most evaporative coolers are not provided with water filters. In some cases a very crude basket type filter is employed, the circulating pump being positioned inside the open basket. Because the basket filter is open at the top, dirt and dust tends to fall into the basket and is then drawn into the pump.

SUMMARY OF THE INVENTION

In accordance with the invention claimed, a new and improved pump with an integral filter is provided for specific application to evaporative coolers. The pump comprises an enclosing shell incorporating a cavity in the base for the pump impeller and a replaceable cylindrical filter that surrounds the impeller cavity.

It is, therefore, one object of this invention to provide an improved pump for use in evaporative coolers.

Another object of this invention is to provide such a pump with a filter that will effectively remove dirt and debris from the water prior to the entry of water into the pump.

A further object of this invention is to provide with the pump an integral but easily replaceable filter.

A still further object of this invention is to provide such a pump and filter assembly in a form that is inexpensive to manufacture.

Further objects and advantages of the invention will become apparent as the following description proceeds and the features of novelty which characterize the invention will be pointed out with particularity in the claims annexed to and forming a part of this specification.

DESCRIPTION OF THE PREFERRED EMBODIMENT

Figure 1:
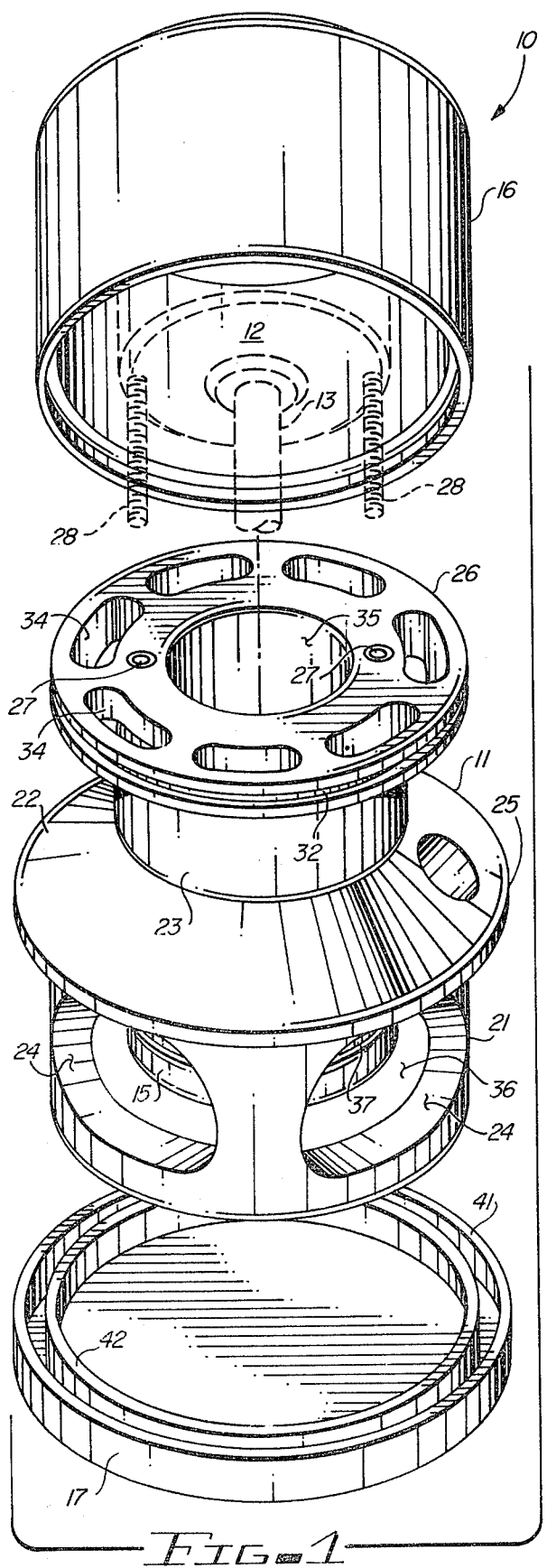
FIG. 1 is an exploded perspective view of the improved pump assembly of the invention, less the associated filter cell.
Figure 2:
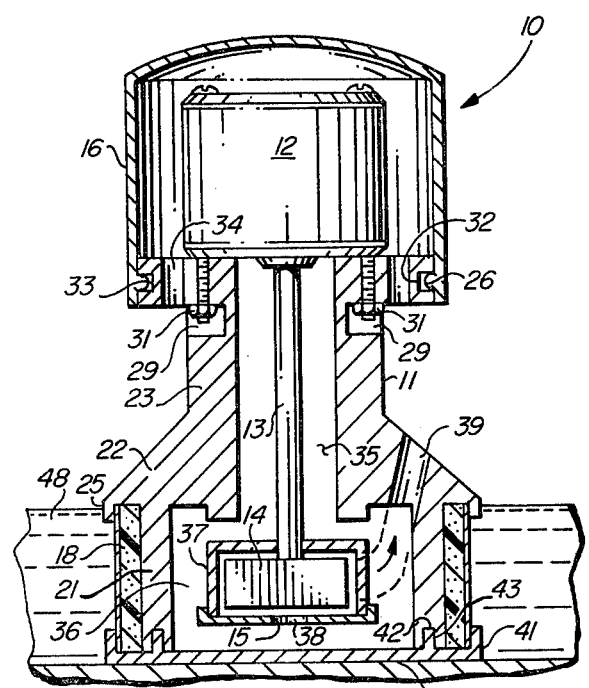
FIG. 2 is a cross-sectional view of the improved pump and filter assembly of the invention.
Figure 3:
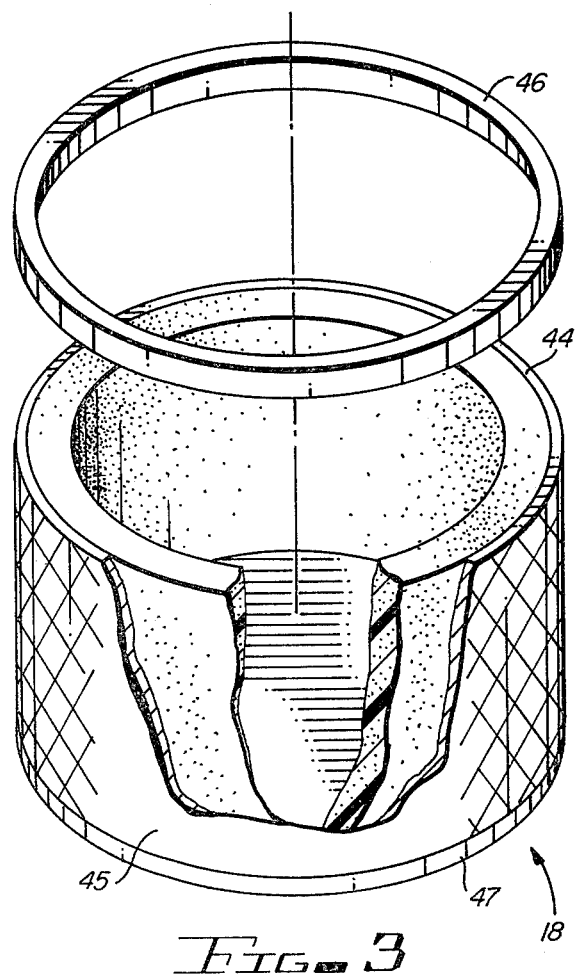
FIG. 3 is an exploded partially broken away perspective view of the filter assembly.

Referring more particularly to the drawing by characters of reference, FIGS. 1-3 disclose an improved pump and filter assembly 10 for use in evaporative coolers and similar applications comprising a main housing 11, an electrically driven pump motor 12, shaft 13, impeller 14, impeller cover 15, motor cap 16, base 17 and filter cell 18.

Pump motor 12 with its drive shaft 13 and impeller 14 is of the same type that is commonly supplied with evaporative coolers. Typically, a simple housing surrounds the shaft and the centrifugal impeller with this assembly standing upright in the evaporative cooler with the impeller housing submerged in water in the base of the cooler.

In accordance with the teachings of this invention, a more elaborate one-piece housing 11 is provided for the pump assembly which has a cylindrical impeller enclosing section 21 at its base, an intermediate conical or tapered shaft enclosing section 22 and an upper cylindrical motor supporting section 23.

The impeller enclosing section 21 has large openings 24 spacedly positioned about its periphery which provide passages for water moving into pump assembly 10. The cylindrical outer surface of section 21 provides support for the filter cell 18.

The intermediate conically tapered section 22 overhangs the impeller enclosing section 21. About the periphery of the overhanging edge of section 22, a downwardly extending lip 25 captures the upper outer edge of the cylindrical filter cell 18.

A flange 26 at the top of section 23 supports motor 12 and motor cap 16. Two holes 27 are provided at the top of section 23 to receive the motor mounting screws 28, which holes pass vertically downwardly through flange 26 each terminating in an opening 29 beneath flange 26. Openings 29 provide clearance for nuts 31 that thread over the ends of mounting screws 28 to secure motor 12 in place. The outer vertical periphery of flange 26 has an annular depression 32 which is provided to receive a ridge 33 that extends about the inside edge surface of motor cap 16. A number of openings 34 extending through flange 26 provide ventilation for motor 12.

Motor cap 16 has the form of an inverted cup. Its top surface is convex so that any water that might fall thereon will readily run off. The motor cap is installed by forcing its lower open end over flange 26 and pressing it down until ridge 33 snaps into place in groove 32.

A centered interior opening 35 in housing 11 provides clearance for shaft 13. Opening 35 terminates in a larger cylindrical opening 36 inside section 21 that provides clearance for impeller 14 and its surrounding shell 37. Shell 37 is cylindrical in shape and open at its lower end with cover 15 in the form of a flat circular lid snapping in place over its open lower end. Openings 38 in cover 15 and additional openings through shell 37 permit water passage from chamber 36 into the interior of shell 37. A port 39 extends from the interior of shell 37 upward and outwardly through the wall of intermediate section 22, as shown. A water line, not shown, is connected to port 39 at its point of exit from section 22 to carry water from pump 10 to the cooling pads of the evaporative cooler in the usual manner.

Base 17 is in the form of a shallow circular lid. It has a low unthreaded rim 41 with annular ridge or tongue 42 set radially inwardly from rim 41 a distance somewhat greater than the wall thickness of filter cell 18. Tongue 42 serves as a positioning and support member for housing 11, there being provided on the under surface of the lower edge of section 21 a mating annular groove 43. When housing 11 is supported on base 17, tongue 42 fits into groove 43 so that the relative positions of the two members are precisely determined.

The filter cell 18, as shown in FIG. 3, comprises a simple cylindrical shell of any appropriate material that will permit the passage of water through its walls but will block contaminants such as dust, sand and other air and waterborne materials.

In the preferred embodiment, filter cell 18 comprises a main filter wall 44, an outer plastic shell 45 and top and bottom retaining rings 46 and 47. The main filter wall 44 is of a reticulated foam material with shell 45 being formed of an open or perforated plastic material that provides mechanical support for the cell and also filters out the relatively large particles of contaminants. Rings 46 and 47 may be formed of plastic or metallic material fitting over the upper and lower ends of cell 18 to hold the filter assembly together.

To install filter cell 18 in the pump and filter assembly 10, housing 11 is first removed from base 17. The filter cell 18 is then positioned on base 17 with the lower ring 47 fitting just inside rim 41 between rim 41 and tongue 42. Housing 11 is then lowered over the filter cell 18, the outer surface of chamber formed by section 21 passing with minimal clearance inside filter cell 18. As housing 11 comes to rest atop tongue 42, the top ring of cell 18 moves into the cavity behind lip 25 under the overhanging edge of housing section 22. The upper edge of filter cell 18 is thus captured behind lip 25, the lower edge is captured inside rim 41 and the inner surface of cell 18 is supported by the outer surface of section 21 except in the areas of openings 24 which have been provided for the passage of water.

In operation, as shown in FIG. 2, lower section 21 is submerged in water 48. As impeller 14 is turned at high speed by motor 12, the centrifugal action of its blades draws water from the base of the evaporative cooler through the walls of filter cell 18, openings 24 and into the interior of the chamber formed by section 21. From the interior of section 21, water enters the impeller housing through holes 38 and through additional entry holes located near the rotational axis of impeller 14. Under the centrifugal forces provided by the pump, the water then passes upwardly through port 39 from which it is carried by a hose to the cooler pads.

When filter cell 18 becomes contaminated by dirt and other materials, it is very easily replaced by simply lifting housing 11 from base 17, removing the soiled filter cell 18, installing a new filter cell 18 and replacing housing 11. In some cases, the soiled filter cell 18 may be cleaned and replaced.

Housing 11, motor cap 16 and base 17 may be inexpensively molded from a plastic material. Plastics are ideally suited to this application because they offer sufficient strength at low cost and are at the same time non-corrosive, an important characteristic in this application where the operating parts are constantly exposed to moisture.

An effective and inexpensive filtered pump assembly with an easily replaceable filter cell is thus provided in accordance with the stated objects of the invention. Although but a single embodiment of the invention has been illustrated and described, it will be apparent to those skilled in the art that various changes and modifications may be made therein without departing from the spirit of the invention or from the scope of the appended claims.

What is claimed is:

1. A pump assembly for an evaporative cooler comprising:
    a housing,
    an electrically driven pump motor having a shaft and an attached impeller driven thereby,
    said motor, shaft and impeller being mounted in said housing,
    said housing comprising a cap for surrounding said motor, a first section for attaching to said cap at one end thereof and enclosing said shaft, and a second section attached at one end to the other end of said first section and forming a chamber around said impeller,
    said second section being provided with a plurality of openings spacedly positioned around its periphery for the ingress of water, and
    a filter for fitting around the outside periphery of said second section and detachably engaging at one end with said other end of said first section, and
    a base detachably connecting to the other end of said second section and enclosing the other end of said filter.

2. The pump assembly set forth in claim 1 wherein:
    said filter comprises an open ended cylindrical configuration.

3. The pump assembly set forth in claim 1 wherein:
    said first section comprises a configuration tapering upwardly toward said cap, and
    the second section comprising a cylindrical configuration,
    said cap, and said first section and said second section comprising a unitary housing structure.

4. The pump assembly set forth in claim 2 wherein:
    said filter comprises a first cylindrical layer of foam material surrounded by a second layer of perforated plastic material that provides mechanical support for said first layer of foam material.

5. The pump assembly set forth in claim 4 wherein:
    said first cylindrical layer comprises a recticulated foam material.

6. The pump assembly set forth in claim 1 wherein:
    said cap and said first and second sections of said housing are formed of a plastic material.

7. The pump assembly set forth in claim 1 wherein:
    said impeller is covered by a perforated cover.

* * * * *